(12) United States Patent
Nagaya et al.

(10) Patent No.: US 6,446,775 B2
(45) Date of Patent: Sep. 10, 2002

(54) ONE-WAY CLUTCH

(75) Inventors: Shuichi Nagaya, Hyogo; Masakazu Domoto; Makoto Tokuda, both of Shizuoka, all of (JP)

(73) Assignee: Bando Chemical Industries, Ltd., Hyogo (JP)

( * ) Notice: Subject to any disclaimer, the term of this patent is extended or adjusted under 35 U.S.C. 154(b) by 9 days.

(21) Appl. No.: 09/832,099

(22) Filed: Apr. 11, 2001

(30) Foreign Application Priority Data

Apr. 12, 2000 (JP) ........................................ 2000-110350

(51) Int. Cl.[7] ............................................. F16G 41/061
(52) U.S. Cl. ..................... 192/41 A; 192/45.1
(58) Field of Search ........................... 192/45.1, 41 R, 192/43, 43.1, 41 A

(56) References Cited

U.S. PATENT DOCUMENTS

| | | | |
|---|---|---|---|
| 2,428,962 A | * 10/1947 | Davis | 192/45.1 |
| 3,613,846 A | * 10/1971 | Zlotek | 192/41 A |
| 3,729,076 A | * 4/1973 | de Lavalette | 192/41 A |
| 4,664,237 A | 5/1987 | Lederman et al. | |
| 4,725,259 A | 2/1988 | Miyata | |
| 4,754,859 A | * 7/1988 | Ouchi et al. | 192/45 |

FOREIGN PATENT DOCUMENTS

| | | |
|---|---|---|
| DE | 4424217 | 1/1996 |
| GB | 1476826 | 6/1977 |
| JP | 61-228153 | 10/1986 |
| JP | 11-210781 | 8/1999 |

* cited by examiner

*Primary Examiner*—Saul Rodriguez
(74) *Attorney, Agent, or Firm*—Nixon Peabody LLP; Thomas W. Cole

(57) ABSTRACT

A one-way clutch is arranged so that a plurality of intermediate members, which are each retained in a cage, each wedge between inner and outer rings when the inner and outer rings relatively rotate in a locking direction and each rock opposite to the direction of the wedging when the inner and outer rings relatively rotate in an idling direction, are pressed in the direction of the wedging by spring members. In this one-way clutch, each spring member includes a pair of coil springs that are juxtaposed to align in an axial direction of the inner and outer rings, are retained at one ends thereof by the cage and resiliently contact at the other ends thereof with the intermediate member. The one ends of both the coil springs are connected together through a connecting portion. The coil springs and the connecting portion are formed of a single wire.

5 Claims, 14 Drawing Sheets

PRIOR ART

PRIOR ART

PRIOR ART

PRIOR ART

PRIOR ART

ONE-WAY CLUTCH

FIELD OF THE INVENTION

This invention relates to a one-way clutch that effects and blocks torque transmission between inner and outer rings by shifting intermediate members according to the direction of relative rotation between the inner and outer rings, and particularly relates to improvement of a spring member for pressing and urging each of the intermediate members into the shift in a direction to wedge between the inner and outer rings.

DESCRIPTION OF THE PRIOR ART

As for example disclosed in Japanese Unexamined Patent Publication No. 61-228153, it is known that in a belt type auxiliary equipment driving apparatus for a vehicle engine, a one-way clutch is disposed, in order to transmit torque of a crank shaft revolving with angular velocity variations due to an explosion stroke of the engine to input shafts of auxiliary equipment through a belt, in a torque transmission path so that for a period of increase in angular velocity during the angular velocity variations torque transmission is effected between the crank shaft and the input shafts of the auxiliary equipment to drive the input shafts into rotation, while for a period of decrease in angular velocity during the angular velocity variations the torque transmission is blocked to avoid torque due to moment of inertia of the input shafts from being transmitted to the crank shaft whereby load placed on the belt is reduced to provide elongated belt life.

Now, the operation of the above one-way clutch will be described. As shown in FIG. 10, each of intermediate members c is retained by a cage d between inner and outer rings a and b for clockwise and counterclockwise rocking motion in the figure and is normally pressed clockwise in the figure by a flat spring e as a spring member to wedge between the inner and outer rings a and b. For the period of increase in angular velocity, for example, when the outer ring b relatively rotates in its locking direction (clockwise in the figure) with respect to the inner ring a, the relative rotation causes each intermediate member c to wedge between the inner and outer rings a and b thereby effecting torque transmission between the inner and outer rings a and b. On the other hand, for the period of decrease in angular velocity, when the outer ring b relatively rotates in its idling direction, the relative rotation causes each intermediate member c to rock opposite to the direction to wedge between the rings against the pressing force of the flat spring e. This produces slippage between each intermediate member c and the inner and outer rings a, b thereby blocking torque transmission.

As the spring member, a coil spring is generally used apart from the above-mentioned flat spring e. A comparison of both the springs indicates that the coil spring is more suitable in durability. Here, description will also be made about the structure of the one-way clutch when the coil spring is used as the spring member. As shown in FIGS. 11 and 12, out of a pair of circumferentially opposed wall surfaces of each retaining hole g of the cage d, the wall surface on the opposite side to the wall surface of a protruding wall for supporting the intermediate member c to allow its rocking motion (left-hand side in FIG. 12) is formed with a recess h and the root end of the coil spring f (left end in FIGS. 11 and 12) is accommodated in the recess h. It is to be noted that the root end of the coil spring f is generally closely wound, though its illustration is omitted.

Meanwhile, in the one-way clutch, torque transmission is started not at a point in time when the angular velocities of the inner and outer rings a and b are coincident with each other for the period of increase in angular velocity but slightly behind the point in time. If this is described using the above case as an example, torque of the outer ring b is started to be transmitted to the inner ring a at a point in time when the outer ring b is further increased in angular velocity to relatively rotate by a certain angle with respect to the inner ring a after the angular velocity of the outer ring b has been increased for the period of increase in angular velocity until it matches the angular velocity of the inner ring a. The relative angle between the inner and outer rings a and b at the point in time is called "a delay angle". If the delay angle is too large, excellent response to an angular velocity variation cannot be attained and therefore proper torque transmission cannot be provided.

The reasons for the occurrence of the delay angle are not only that each intermediate member c essentially requires a certain time to rock to wedge between the inner and outer rings a and b due to relative rotation of the inner and outer rings a and b in the locking direction but also that each intermediate member c vibrates due to angular velocity variations. Namely, when each intermediate member c vibrates, slippage occurs between the intermediate member c and each of the inner and outer rings a and b even if the inner and outer rings a and b relatively rotate in the locking direction, and therefore its wedging movement between the inner and outer rings a and b is further delayed so that the intermediate member c cannot follow an angular velocity variation.

Further, the frequency of angular velocity variations of the vehicle engine is low at low engine speeds and high at high engine speeds. For example, in a four-cycle four-cylinder engine involving two explosion strokes for one revolution of the crank shaft, the frequency of angular velocity variations reaches 100 to 200 Hz at high engine speeds where the speed of the crank shaft reaches 3000 to 6000 rpm.

Accordingly, in order to attain excellent response to angular velocity variations in the entire speed range of the vehicle engine, it is necessary to allow each intermediate member c to sufficiently follow high-frequency angular velocity variations at high engine speeds. To satisfy this requirement, the spring member must have a large spring constant enough to suppress variations of the intermediate member c due to such high-frequency angular velocity variations.

Problems to be Solved

However, the conventional one-way clutch using the coil springs f as the spring members generally has the disadvantage of a lower spring constant of the coil spring f as compared with the flat spring e of equal size in its operating direction. As can be seen from this point, the coil spring f is excellent in durability over the flat spring e, whereas the one-way clutch using the coil spring f has a problem of the difficulty in attaining excellent response to high-frequency variations as described above as compared with the one-way clutch using the flat spring e. In this case, if the spring constant is increased by increasing the size of each coil spring f in the operating direction, the one-way clutch will be greater. This causes a new problem of the difficulty in disposing the one-way clutch in an engine room of the vehicle.

Further, the conventional one-way clutch using the coil springs f has another problem. Specifically, as shown with exaggeration in FIG. 13, the root end of the coil spring f has a tendency to easily extrude from the recess h toward the outer ring b as a result of relative rotation between the inner and outer rings a and b. Further, if expansion and contraction of the coil spring f itself resulting from rocking motion of the intermediate member c is added to this tendency, the distal end (right end in FIG. 14) of the coil spring f is also displaced toward the outer ring b as shown with exaggeration in the figure. Furthermore, since the rotation of the coil spring f itself around the axis of the coil also concurs, these events results in easily providing an unstable pressing force on the intermediate member c. This also invites insufficient suppression of the above-mentioned vibrations of the intermediate member c.

The present invention has been made in view of the foregoing points and therefore a major object of the present invention is to obtain, in using coil springs as spring members for a one-way clutch into which torque accompanied with high-frequency angular velocity variations is input, a high spring constant equivalent to the case of using flat springs even if the size of the coil spring in its operating direction is not increased, thereby providing a one-way clutch having excellent response to input torque accompanied with high-frequency angular velocity variations and excellent durability.

SUMMARY OF THE INVENTION

The present invention takes the following measures to solve the above problems.

A first inventive measure is directed to a one-way clutch comprising: an inner ring; an outer ring disposed coaxially around an outer periphery of the inner ring and assembled relatively rotatably with the inner ring; a cage disposed between the inner and outer rings for relative rotation with respect to the inner and outer rings; a plurality of intermediate members that are each retained in the cage so as to be changeable in position in a plane orthogonal to the axis of the inner and outer rings, change the position thereof to wedge between the inner and outer rings upon relative rotation of the inner and outer rings in a locking direction to effect torque transmission between the inner and outer rings, and change the position thereof opposite to the direction of wedging between the inner and outer rings upon relative rotation of the inner and outer rings in an idling direction to block torque transmission between the inner and outer rings; and a plurality of spring members, disposed correspondingly to the intermediate members in the cage, for pressing the corresponding intermediate members to wedge the intermediate members between the inner and outer rings.

Each of the spring members includes: a plurality of coil springs that are juxtaposed to align in an axial direction of the inner and outer rings and extend in a direction to press the corresponding intermediate member, are retained at one ends thereof by the cage and resiliently contact at the other ends thereof with the intermediate member; and a connecting portion for connecting the one ends of the plurality of coil springs together.

In this inventive measure, since each of the spring members of the one-way clutch includes the plurality of coil springs juxtaposed with respect to the corresponding intermediate member, the entire spring constant of the spring member is obtained by summing up spring constants of the coil springs. Accordingly, even if the natural length of each coil spring is not increased, the spring constant of the spring member on the intermediate member becomes large as a whole.

Further, since the one ends of the coil springs are connected together through the connecting portion, each coil spring is restrained against rotation around the coil axis and when each coil spring is retained at its one end by the cage, the other end of the coil spring is easily fixed using the connecting portion. Accordingly, each coil spring makes its pressing conditions against the intermediate member steady and therefore the pressing force on the intermediate member is also stabilized. Furthermore, since the plurality of coil springs are formed integrally through the connecting portion, increase in number of components can be avoided in spite of use of the plurality of coil springs for each intermediate member.

In a second inventive measure, when the number of coil springs provided in each of the spring members is two in the first inventive measure, the two coil springs and the connecting portion of each of the spring members are formed of a single wire.

With this inventive measure, since the two coil springs and the connecting portion are formed of a single wire, the connection of both the coil springs through the connecting portion can be made optimally.

In a third inventive measure, the end of a wire forming the other end of the coil spring in the first and second inventive measures is formed to avoid contact with the inner and outer rings.

With this inventive measure, when torque is input to the one-way clutch to rotate the cage, in some cases attendant centrifugal forces or a position change of the intermediate member may change the position of the other end of the coil spring in a radial direction of the inner and outer rings. In this case, since the wire end forming the other end of the coil spring does not contact with the inner and outer rings, there can be obviated the occurrence of events due to engagement of the wire end with the inner and outer rings, i.e., an event that the operation of the coil spring is blocked or an event that the contact surfaces of the inner and outer rings with the intermediate member are damaged to adversely affect the position change of the intermediate member.

In a fourth inventive measure, the one-way clutch in the first to third inventive measures is disposed in a torque transmission path for transmitting torque of a crank shaft revolving with angular velocity variations due to an explosion stroke of a vehicle engine to an input shaft of auxiliary equipment through a power transmission belt.

With this inventive measure, torque accompanied with angular velocity variations due to the explosion stroke of the vehicle engine is input to the one-way clutch in the torque transmission path in which torque of the crank shaft of the vehicle engine is transmitted to the input shaft of the auxiliary equipment through the power transmission belt. Therefore, each intermediate member vibrates due to the angular velocity variations. Particularly for a four-cylinder four-cycle engine, the frequency of angular velocity variations is a high frequency in the range of 100 to 200 HZ at high engine speeds of 3000 to 6000 rpm. Accordingly, excellent properties of the spring member in the first to third inventive measures can be exhibited specifically and properly.

In a fifth inventive measure, based on the fourth inventive measure, the inner ring is provided to be connectable with one of the crank shaft of the vehicle engine and the input shaft of the auxiliary equipment, and the outer ring is provided with a pulley section for training the power transmission belt therearound to rotate unitarily with the outer ring.

With this inventive measure, when the one-way clutch is disposed in a belt type auxiliary equipment driving apparatus for an vehicle engine, the inner ring is connected to the crank shaft of the vehicle engine or the input shaft of the auxiliary equipment and the power transmission belt is trained around the outer ring. In this case, since the outer ring is provided unitarily rotatably with the pulley section for training the power transmission belt thereover, disposition of the one-way clutch in the belt type auxiliary equipment driving apparatus is facilitated.

Effects of Invention

According to the present invention, in a one-way clutch which has a plurality of intermediate members for changing their positions in a direction to wedge between inner and outer rings when the inner and outer rings relatively rotate in a locking direction and changing their positions opposite to the direction to wedge between the inner and outer rings when the inner and outer rings relatively rotate in an idling direction and in which the intermediate members are pressed by corresponding spring members to change their positions in the direction to wedge between the inner and outer rings, each of the spring members includes: a plurality of coil springs that are juxtaposed with respect to the intermediate member, are retained at one ends thereof by a cage and resiliently connect at the other ends thereof with the intermediate member; and a connecting portion for connecting the plurality of coil springs together. Therefore, the entire spring constant of the spring member can be increased even if the size of each coil spring in its operating direction is not increased, each coil spring can be restrained against rotation around the coil axis, and each coil spring can be fixed at its one end with the use of the connecting portion. Accordingly, even on receipt of a centrifugal force or vibration due to high-speed rotation, each coil spring can make its pressing conditions against the intermediate member steady thereby providing a stable pressing force of each coil spring. Further, integral configuration of the plurality of coil springs can avoid increase in number of components due to use of the plurality of coil springs for each intermediate member.

According to the second inventive measure, when the number of coil springs for each spring member is two, the two coil springs and the connecting portion are formed of a single wire. Therefore, the two coil springs can be optimally connected together in one piece.

According to the third inventive measure, since the wire end at the other end of each coil spring resiliently contacting with the intermediate member is provided to avoid contact with the inner and outer rings, there can be obviated the occurrence of events due to engagement of the wire end with the inner and outer rings, i.e., an event that the operation of the coil spring itself is blocked or an event that the contact surfaces of the inner and outer rings with the intermediate member are damaged.

According to the fourth inventive measure, since the one-way clutch is used for a belt type auxiliary equipment driving apparatus for a vehicle engine frequently producing high-frequency vibrations, this properly provides the effects of the inventive measure of claim 1.

According to the fifth inventive measure, since the pulley section for training the power transmission belt therearound is provided around the outer ring so that the one-way clutch can be used as a one-way clutch-integrated pulley, the one-way clutch according to the present invention can be readily disposed in the belt type auxiliary equipment driving apparatus for a vehicle engine.

DESCRIPTION OF THE PREFERRED EMBODIMENT

Hereinafter, an embodiment of the present invention will be described in detail with reference to the drawings.

Figure 5:
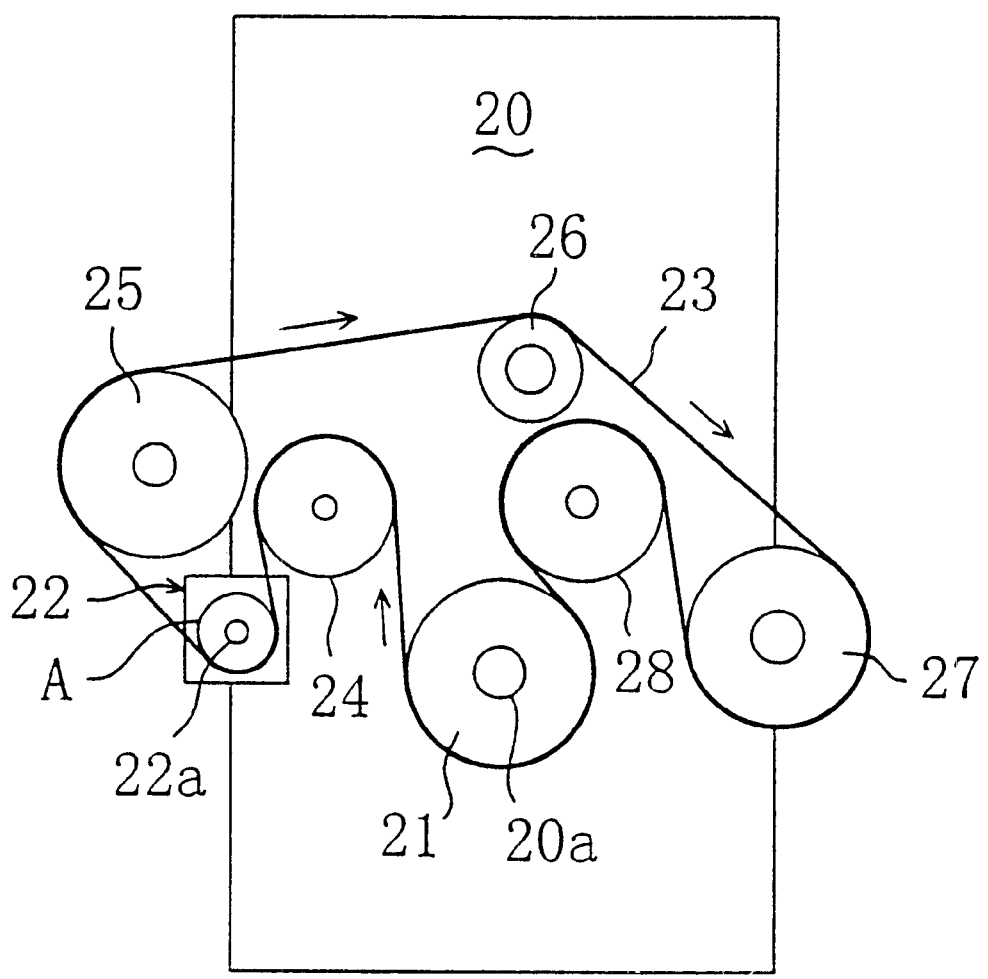
FIG. 5 is a schematic view showing the layout of an auxiliary equipment driving apparatus for a vehicle engine.

FIG. 5 schematically shows the layout of a belt type auxiliary equipment driving apparatus for a vehicle engine in which a one-way clutch-integrated pulley A according to a first embodiment of the present invention is disposed. This auxiliary equipment driving apparatus is provided at one end of a four-cylinder four-cycle engine 20 mounted on an automotive vehicle. The layout of this auxiliary equipment driving apparatus is a so-called serpentine layout in which a single V-ribbed belt 23 as a power transmission belt is trained in a serpentined manner among a drive pulley 21 mounted on a crank shaft 20a revolving with slight variations in angular velocity due to an explosion stroke of the engine 20 and a plurality of driven pulleys respectively mounted on input shafts of a plurality of auxiliary equipment including an alternator 22.

More specifically, as the above-mentioned driven pulleys, a tension pulley 24 of an automatic belt tensioner, a pulley 25 for a hydraulic pump of a power steering, an idler pulley 26, a pulley 27 for a compressor of an air conditioner, and a pulley 28 for an engine-cooling fan are arranged, starting with the drive pulley 21, in the order of such a running direction of the V-ribbed belt 23 as shown in arrows in FIG. 5. In addition, the one-way clutch-integrated pulley A is disposed between the tension pulley 24 of the automatic belt tensioner and the pulley 25 for a hydraulic pump of a power steering, and is mounted on an alternator shaft 22a of the alternator 22 in which inertial torque of a rotor is relatively large.

Figure 6:
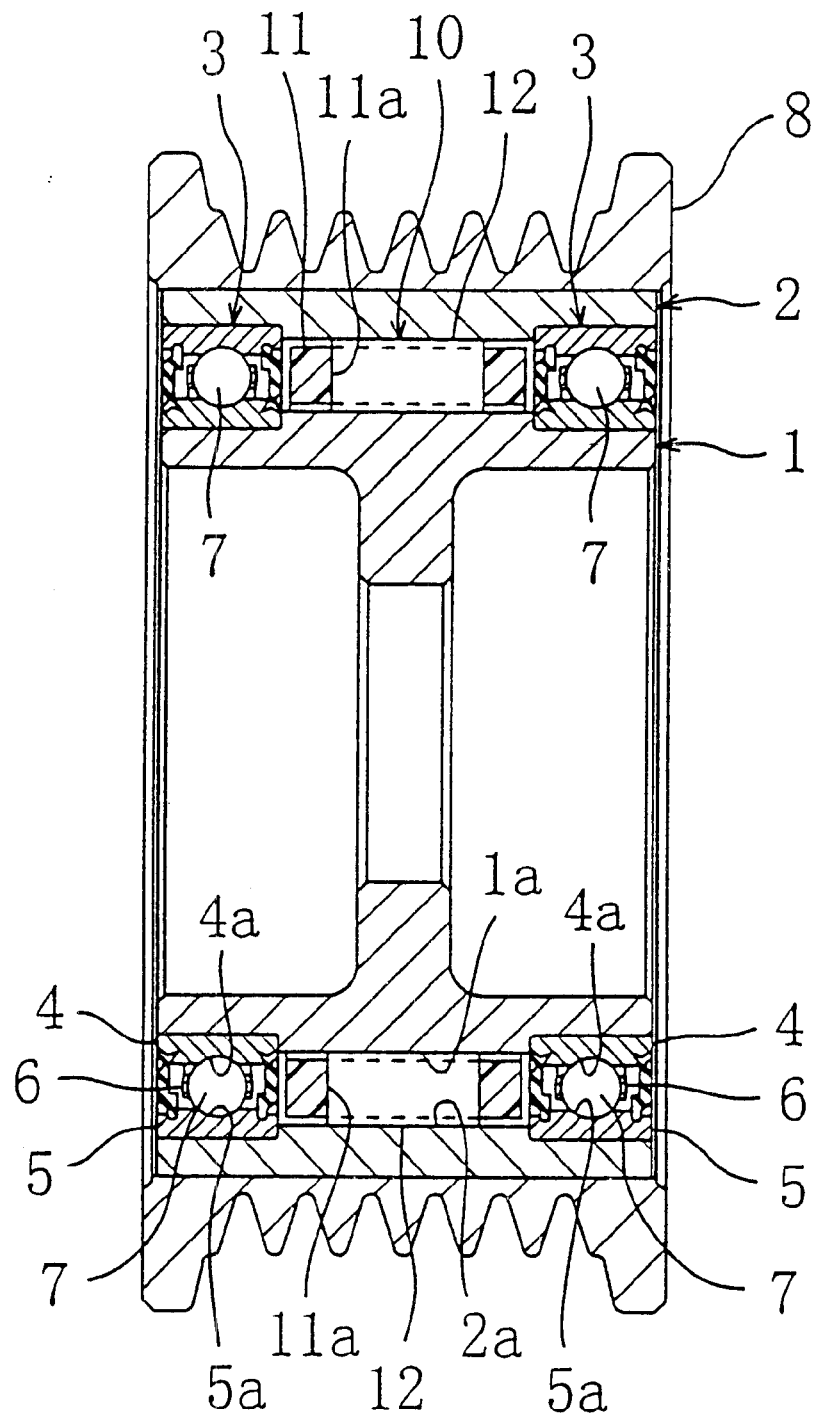
FIG. 6 is a longitudinal cross-sectional view showing the entire structure of the one-way clutch-integrated pulley.

As shown in FIG. 6, the one-way clutch-integrated pulley A includes an inner ring 1 connected to the alternator shaft 22a and an outer ring 2 coaxially disposed around the outer periphery of the inner ring 1, and the inner and outer rings 1, 2 are relatively rotatably assembled by a pair of bearings 3, 3 arranged between the inner and outer rings 1, 2 at both sides in the axial direction (both lateral sides in FIG. 6). Further, a pulley section 8 for training the V-ribbed belt 23 therearound is fitted for unitary rotation onto the outer periphery of the outer ring 2. Furthermore, between both the bearings 3 and 3, a clutch mechanism 10 is provided for effecting or blocking torque transmission between the inner and outer rings 1, 2 according to the direction of relative rotation of the inner and outer rings 1, 2.

Each bearing 3 is a deep-groove ball bearing, which includes an annular bearing inner ring 4 fixedly fitted onto the outer periphery of the inner ring 1 to unitarily rotate with the inner ring 1 and an annular bearing outer ring 5 disposed coaxially around the outer periphery of the bearing inner ring 4 and fixedly fitted into the inner periphery of the outer ring 2 to unitarily rotate with the outer ring 2. The outer periphery of the bearing inner ring 4 and the inner periphery of the bearing outer ring 5 are provided throughout these peripheries with deep grooves 4a, 5a of arcuate cross section, respectively. Further, an annular cage 6 is coaxially disposed between the bearing inner and outer rings 4, 5 and for relative rotation with the bearing inner and outer rings 4, 5. A plurality of steel balls 7, 7, . . . are retained by the cage 6 at regular circumferential pitches. The steel balls 7, 7, . . . roll circumferentially in the deep grooves 4a, 5a of the bearing inner and outer rings 4, 5 to allow the inner and outer rings 1, 2 to relatively rotate.

As also shown in FIGS. 1 to 4, the clutch mechanism 10 includes a ring-like cage 11 disposed between the inner and outer rings 1, 2 for relative rotation with the inner and outer rings 1, 2 and a plurality of intermediate members 12, 12, . . . retained by the cage 11 for rocking motion in a single plane orthogonal to the axis of the inner and outer rings 1, 2. In the cage 11, a plurality of retaining holes 11a, 11a, . . . of rectangular cross section cut through the cage 11 in its radial direction are arranged at predetermined circumferential pitches. The intermediate members 12, 12, are accommodated for rocking motion in the retaining holes 11a, 11a, . . ., respectively. Out of two circumferentially opposed inner wall surfaces of each retaining hole 11a, one inner wall surface (right-hand one in FIG. 4) is formed in a protruding wall extending with cross section like letter inverted-V toward the other inner wall surface (left-hand one in the same figure). In the other inner wall surface, two recesses 13, 13 are juxtaposed to align in the axial direction of the inner and outer rings 1, 2 and so as to be open toward the one inner wall surface (rightward in the figure) and radially outward (upward in the figure). Further, at a location between the two recesses 13 and 13 and circumferentially opposite to the one inner wall surface (left side in the figure), a groove 14 open radially outward is provided to extend in the axial direction. The bottom of the groove 14 is located radially outward beyond the bottom surface of the recess 13. Each end of the groove 14 is open to the corresponding recess 13.

Each intermediate member 12 is formed in a bar and a gourd-like section, and is disposed in parallel with the axis of the inner and outer rings 1, 2 and so that the lengthwise direction of the section thereof substantially matches the radial direction of the inner and outer rings 1, 2. The lengthwise size is slightly larger than the distance between both cam surfaces 1a and 2a of the inner and outer rings 1 and 2, the surface of the intermediate member 12 on the inner ring 1 side serves as a cam surface 12a slidable on the cam surface 1a of the inner ring 1, and the surface thereof on the outer ring 2 side serves as a cam surface 12b slidable on the cam surface 2a of the outer ring 2. When each intermediate member 12 rocks clockwise in FIG. 4, it wedges between the inner and outer rings 1 and 2 so that the cam surfaces 12a and 12b of the intermediate member 12 are pressed against the cam surfaces 1a and 2a of the inner and outer rings 1 and 2, respectively. On the other hand, when each intermediate member 12 rocks counterclockwise in the same figure, the cam surfaces 12a and 12b thereof come into sliding contact with the cam surfaces 1a and 2a of the inner and outer rings 1 and 2, respectively. Further, out of two surfaces located at both widthwise ends (both lateral sides in FIG. 4) of the section of each intermediate member 12, the surface on the side corresponding to the protruding wall of the retaining hole 11a of the cage 11 (right side in the figure) is recessed in the form of a V-groove having gently inclined surfaces, and the top of the protruding wall is brought into line contact with the bottom of the groove in the axial direction of the inner and outer rings 1, 2. The intermediate member 12 thus rocks on the contact portion as a fulcrum.

In the cage 11 of the clutch mechanism 10, a spring member 15 is placed for each intermediate member 12, and each intermediate member 12 is pressed by the corresponding spring member 15 in the direction to wedge between the inner and outer rings 1 and 2.

Figure 1:
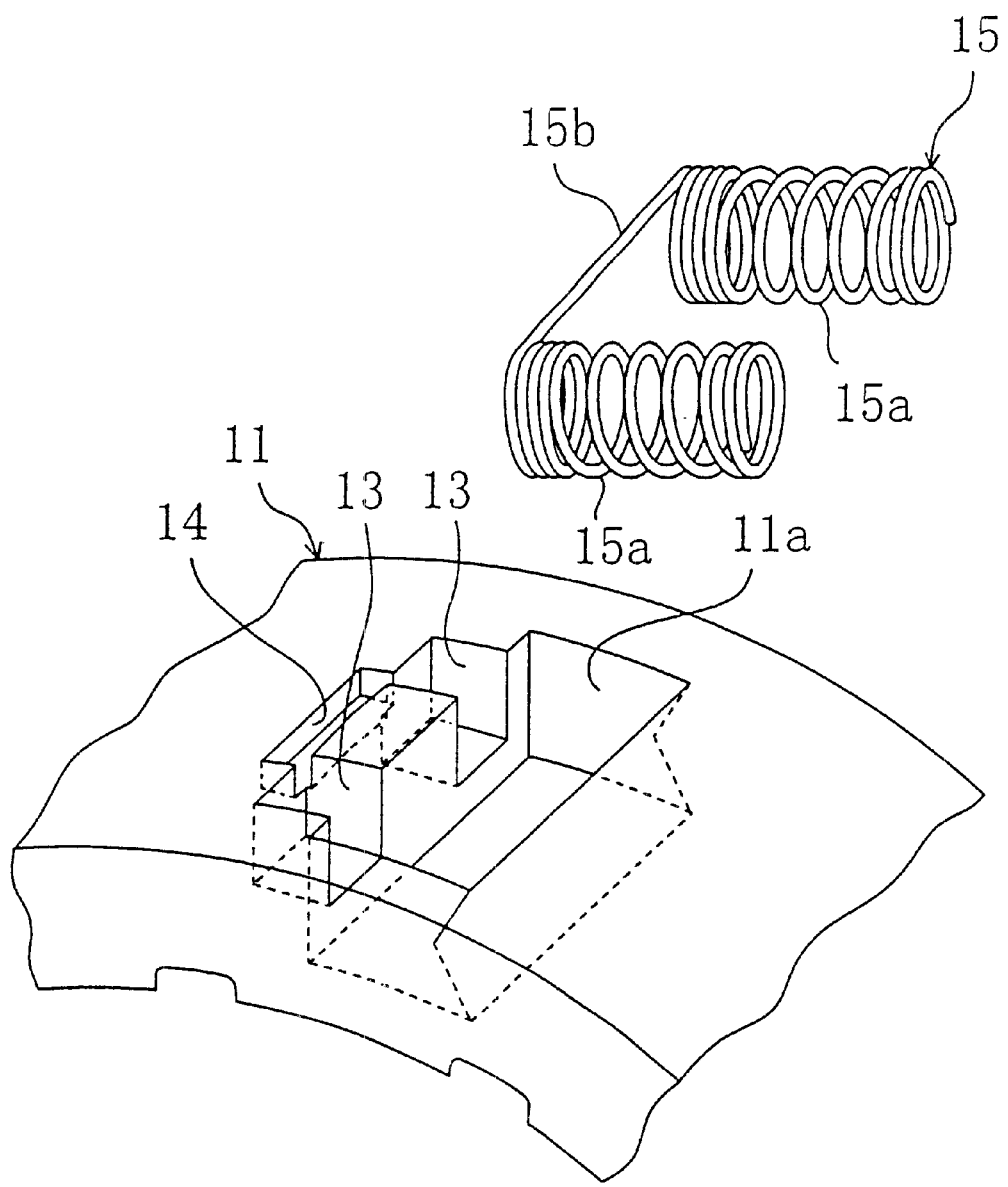
FIG. 1 is an exploded perspective view showing an essential part of a one-way clutch-integrated pulley according to a first embodiment of the present invention.
Figure 2:
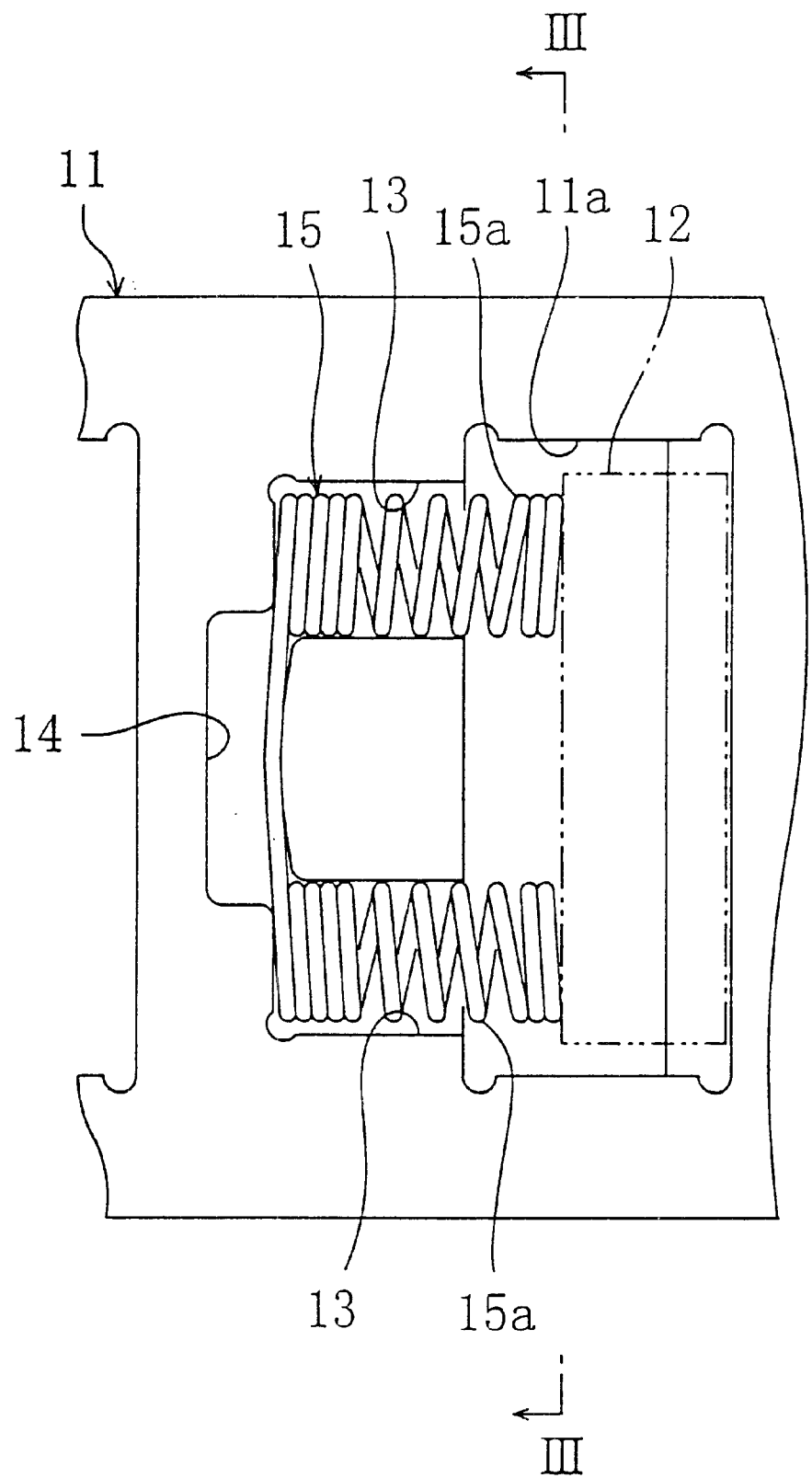
FIG. 2 is a view showing the essential part of the one-way clutch-integrated pulley when viewed from an outer ring.
Figure 3:
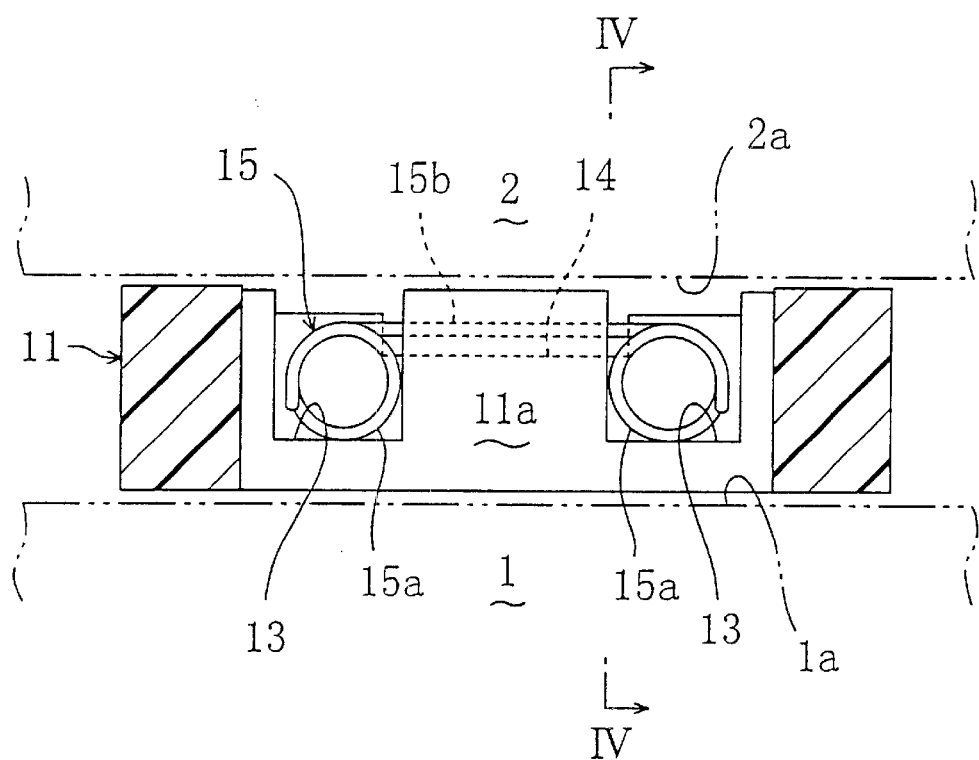
FIG. 3 is a cross-sectional view taken along the line III—III of FIG. 2.
Figure 4:
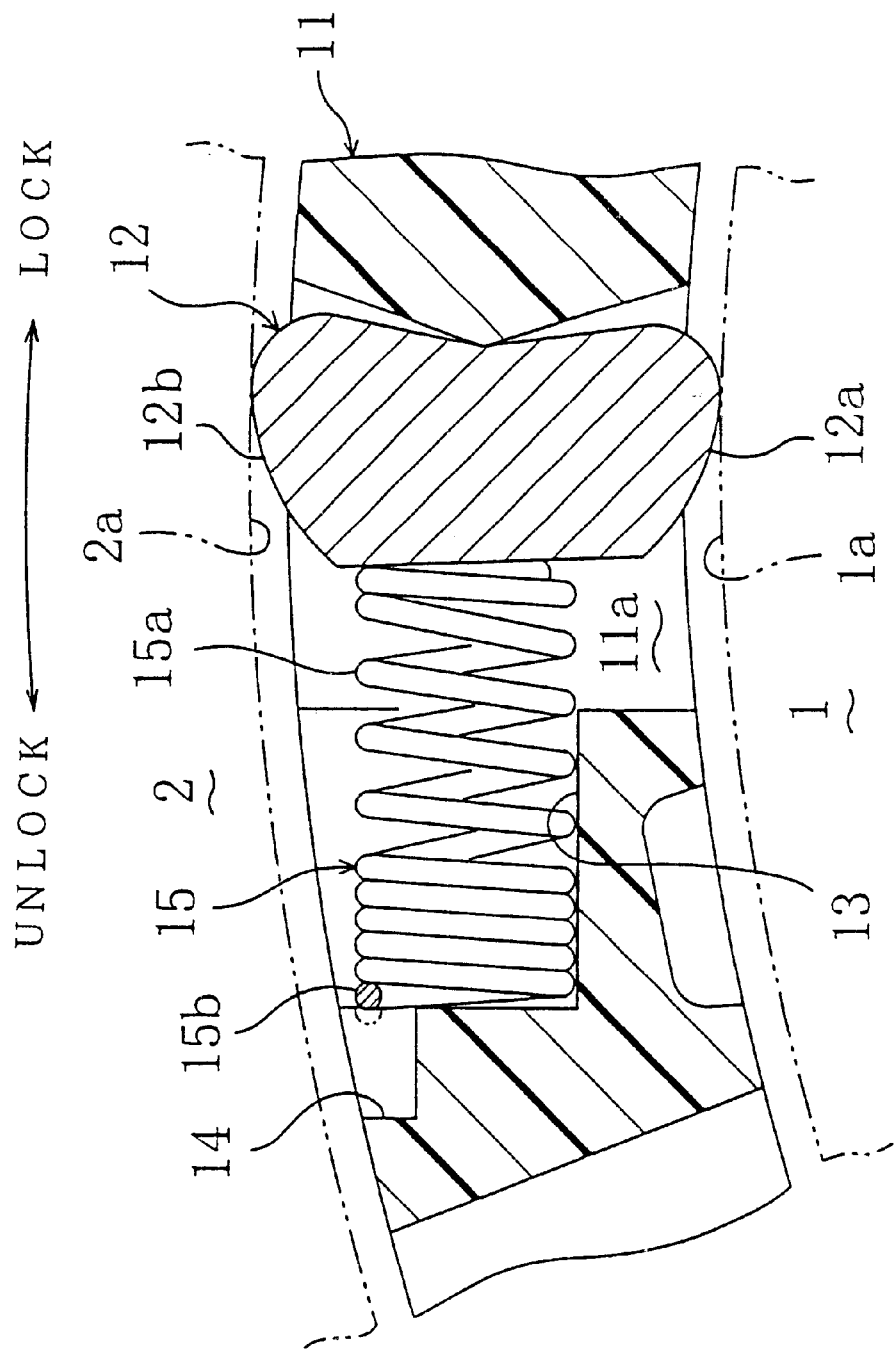
FIG. 4 is a cross-sectional view taken along the line IV—IV of FIG. 3.

Furthermore, in the present embodiment, as shown in enlarged manner in FIGS. 1 to 3, each spring member 15 includes a pair of coil springs 15a, 15a which are juxtaposed to align in the axial direction of the inner and outer rings 1, 2 and extend in a direction to press the corresponding intermediate member 12, retained at one ends thereof (left ends in FIG. 1: hereinafter referred to as root ends) by the cage, and resiliently contacted at the other ends (right ends in the figure: hereinafter referred to as distal ends) with the intermediate member 12. Furthermore, between both the root ends of the coil springs 15a and 15a, a connecting portion 15b is provided for connecting both the root ends together.

Specifically, the pair of coil springs 15a, 15a and the connecting portion 15b of each spring member 15 are formed of a single wire. In its formation, one coil spring 15a (lower one in FIG. 2) is formed dextrally, while the other coil spring 15a (upper one in the figure) is formed sinistrally. The root end of the dextrally formed coil spring 15a and the root end of the sinistrally formed coil spring 15a connect each other through a wire portion extending substantially linearly along the axis of the inner and outer rings 1 and 2. The above-mentioned connecting portion 15b is constituted by the linear wire portion. The pair of coil springs 15a, 15a are manufactured under the same specifications such as the coil diameter and the effective number of turns except for the turning direction. Accordingly, the spring constants $k_1$ of the two coil springs 15a, 15a are identical ($k_1$=a). In the present embodiment, the spring constant $k_1$ of each coil spring 15a is identical with the spring constant $k_2$ of a coil spring in the case where a spring member is formed of a single coil spring like the prior art ($k_1$=$k_2$=a). In other words, the spring constant k' of the conventional spring member is k'=$k_2$=a.

Further, the root end of the dextral coil spring 15a is accommodated in one (upper one in FIG. 2) of the pair of recesses 13, 13 corresponding to each retaining hole of the cage 11, while the root end of the sinistral coil spring 15a is accommodated in the other recess 13 (lower one in the figure). In this case, the root end of each coil spring 15a is closely wound like the prior art. Furthermore, the connecting portion 15b is accommodated in the groove 14 of the cage 11, and both ends of the connecting portion 15b are placed in continuous spaces between the groove 14 and the recesses 13 and 13, respectively. In this case, the distance between both the coil springs 15a and 15a is set slightly smaller than the thickness of a partition wall of the cage 11 which separates both the recesses 13 and 13 from each other so that both the coil springs 15a, 15a sandwich therebetween the partition wall on both sides in the axial direction of the inner and outer rings 1, 2. The coil springs 15a, 15a are thereby held against displacement at the corresponding root end sides.

Furthermore, the distal end turn of each coil spring 15a is formed so that when the corresponding portion of the wire extends circularly from the position proximate to the outer ring 2 toward the position proximate to the inner ring 1, it terminates ahead of the position proximate to the inner ring 1. The distal end portion of the wire is thereby held against contact with the cam surfaces 1a, 2a of the inner and outer rings 1, 2.

Now, calculation will be made of the natural frequency f of the spring member 15 with respect to each intermediate member 12 in the one-way clutch-integrated pulley A having the above-described construction. First, since the spring constant $k_1$ of each coil spring 15a is $k_1=a$, the spring constant k of the spring member 15 formed of the two coil springs 15a and 15a is $$k=k1+k1=a+a=2a$$

which is two times as large as the spring constant ($k'=k_2=a$) in the case where the spring member is formed of a single coil spring like the prior art.

Therefore, the natural frequency F of the spring member 15 in the one-way clutch-integrated pulley A is $$F=(\tfrac{1}{2}\pi)(k/m)^{1/2}=(\tfrac{1}{2}\pi)(2a/m)^{1/2}.$$

(where m is the mass of the intermediate member 12).

On the other hand, the natural frequency F' of the conventional spring member is $$F'=(\tfrac{1}{2}\pi)(k/m)^{1/2}=(\tfrac{1}{2}\pi)(a/m)^{1/2}.$$

Accordingly, as expressed by the following formula, it can be understood that the natural frequency F of the spring member 15 in the one-way clutch-integrated pulley A according to the present embodiment is approximately 1.414 times as large as the natural frequency F' of the conventional spring member.

$$\begin{aligned}F \div F' &= \{(1/2\pi)(2a/m)^{1/2}\} \div \{(1/2\pi)(a/m)^{1/2}\}\\ &= (2a/m)^{1/2} \div (a/m)^{1/2}\\ &= (2)^{1/2} \approx 1.414\end{aligned}$$

According to the present embodiment, in disposing a one-way clutch-integrated pulley A in a torque transmission path of serpentine layout in which torque of a crank shaft 20a of a vehicle engine 20 is transmitted to auxiliary equipment such as an alternator 22 through a V-ribbed belt 23, the one-way clutch-integrated pulley A uses, as a spring member 15 for pressing each intermediate member 12 into wedging between inner and outer rings 1 and 2, a spring member having a pair of coil springs 15a, 15a juxtaposed to the intermediate member 12. Therefore, even if the size of each coil spring 15a in its operating direction is not increased, the spring member can attain the spring constant two times as large as that in the case where a spring member is formed of a single coil spring like the prior art. This enhances response to input torque accompanied with high-frequency angular velocity variations in spite of excellent durability.

Further, since the pair of coil springs 15a, 15a are integrally formed by connecting one ends of both the coil springs 15a, 15a through the connecting portion 15b, each coil spring 15a can be restrained against rotation around the coil axis and can be fixed at the one end by using the connecting portion 15b. Accordingly, the coil springs 15a, 15a can make their pressing conditions against the intermediate member 12 steady even when subjected to centrifugal forces or vibrations due to high-speed engine revolution, thereby enabling its pressing force to be stabilized. Furthermore, integral configuration of the pair of coil springs 15a, 15a suppresses increase in number of components in spite of use of two coil springs 15a, 15a for each intermediate member 12.

The above embodiment describes the one-way clutch-integrated pulley A of the type which effects or blocks torque transmission between the inner and outer rings 1 and 2 by rocking motion of each intermediate member 12. However, the present invention is also applicable to one-way clutch-integrated pulleys using intermediate members of other types.

In the above embodiment, description has been made about the case where a deep-groove ball bearing is used as the bearing 3 interposed between the inner and outer rings 1 and 2. However, other types of bearings may be used instead and no special limitations are imposed on the number and layout of bearings.

Further, the above embodiment describes the case where each spring member 15 has two coil springs 15a, 15a. However, the number of coil springs may be three or more.

Furthermore, in the above embodiment, the connecting portion 15b provided in each spring member 15 is formed substantially linearly. However, the shape of the connecting portion can be properly designed depending upon the mounting structure of the spring member in the cage and the like.

Furthermore, the above embodiment describes the case where the one-way clutch-integrated pulley A is disposed in the auxiliary equipment driving apparatus for a vehicle engine. However, it goes without saying that the pulley can be disposed in other torque transmission paths.

In addition, the above embodiment describes the one-way clutch-integrated pulley A as a built-in type one-way clutch in which the pulley section 8 is fitted onto the outer ring 2. However, the present invention is applicable to one-way clutches of various types which press intermediate members in the direction of wedging between inner and outer rings with spring members.

Experimental Example

Next, when the one-way clutch-integrated pulley A of the above embodiment is used as an inventive example, an experiment carried out for examining the delay angle thereof will be described.

Figure 7:
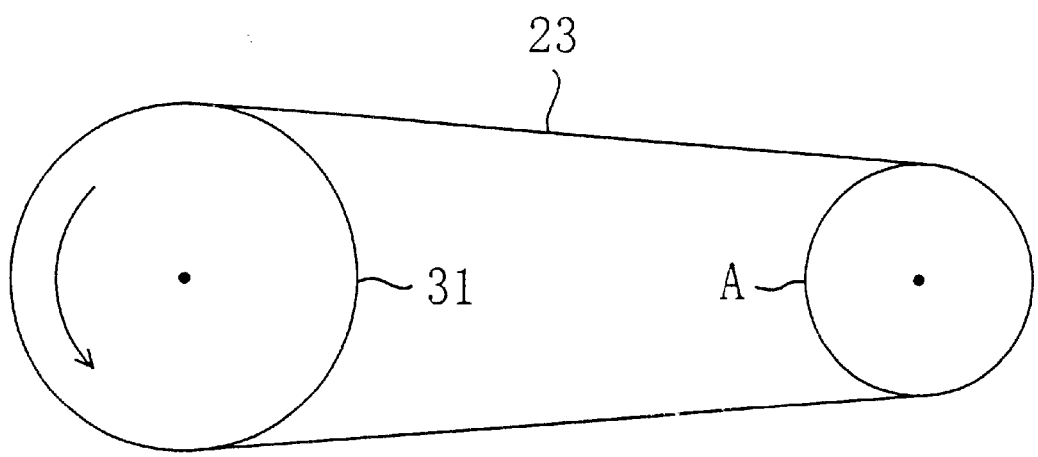
FIG. 7 is a schematic view showing how an experimental example is to be performed.
Figure 8:
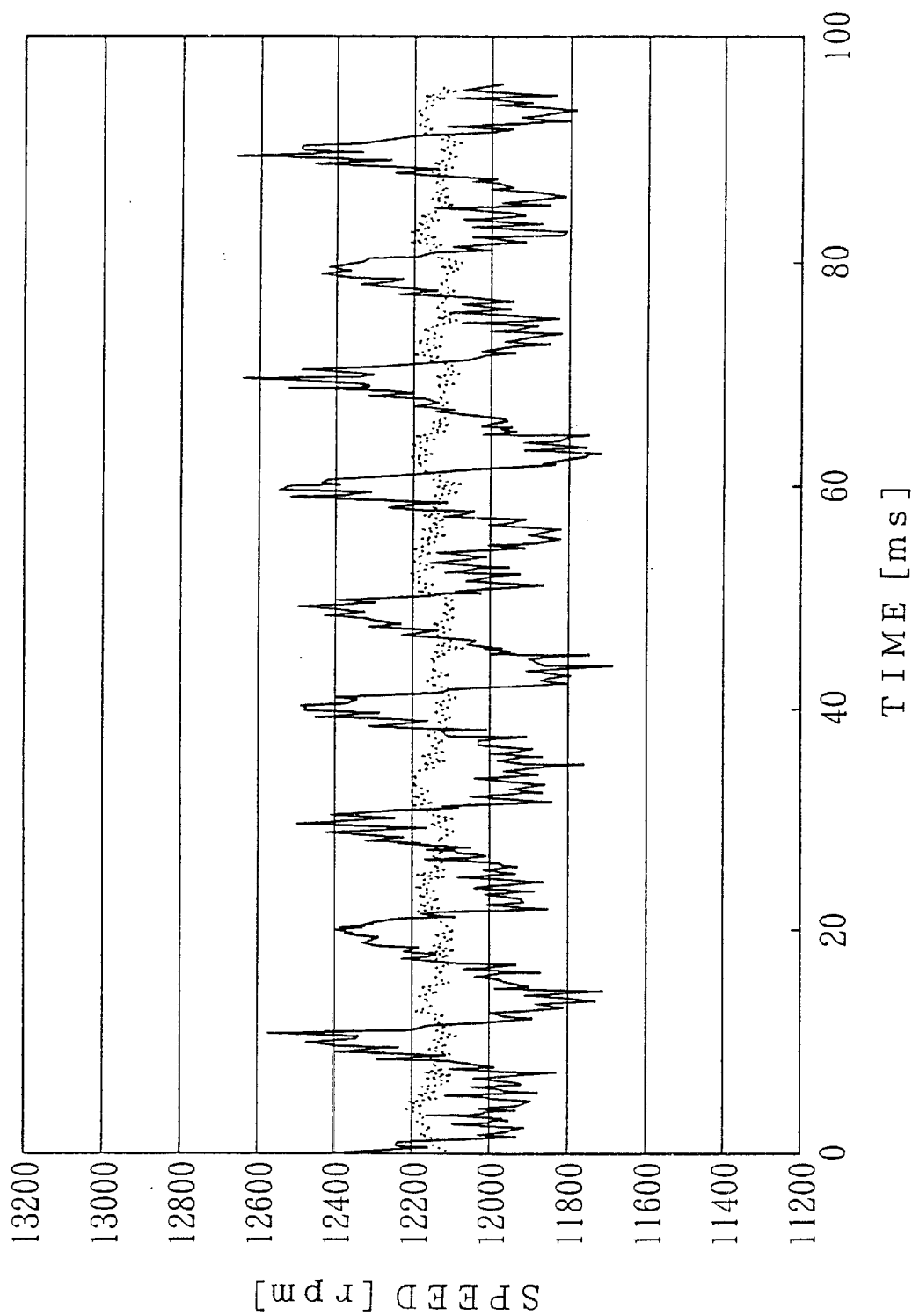
FIG. 8 is a plot showing the change in rotational speed of an inner ring due to the delay angle under conditions of high-frequency speed variations of a vehicle engine in an inventive example together with the change in rotational speed of the outer ring.

Specifically, as schematically shown in FIG. 7, a V-ribbed belt 23 was trained between a drive pulley 31 of a V-ribbed pulley and the one-way clutch-integrated pulley A, and in this arrangement the drive pulley 31 was driven into rotation so that the one-way clutch-integrated pulley A could input torque with a target speed of 12500 rpm, a rate of variation of revolution of 3% and a frequency of variations of 100 to 200 Hz. At the time, the speeds of the outer and inner rings were measured. Then, the mean value of delay angles was calculated based on the measured data. The above speed and conditions of variation of revolution conform to angular velocity variations of torque input to the one-way clutch-integrated pulley A when the speed is 3000 to 6000 rpm in the four-cycle four-cylinder engine. Further, the inner ring of the one-way clutch-integrated pulley A is connected to an alternator shaft of an alternator and a load of 120 A is placed on the alternator. The changes of speed (unit: rpm) of the inner and outer rings in this case are shown together in FIG. 8.

The calculated mean value of delay angles in the one-way clutch-integrated pulley A under the above conditions was in the order of slightly above 3°.

Figure 9:
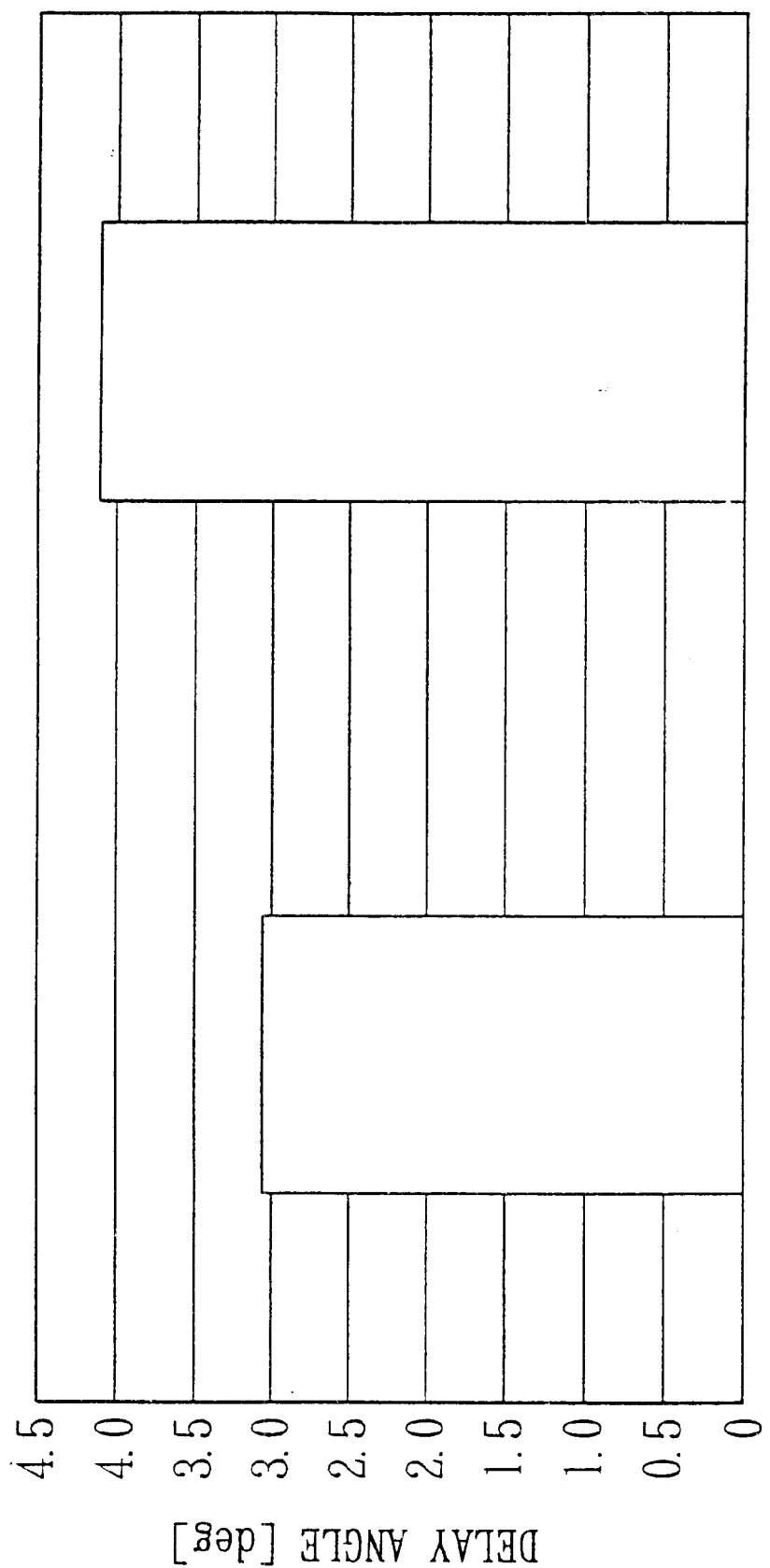
FIG. 9 is a plot showing the delay angles of inventive and comparative examples together.
Figure 10:
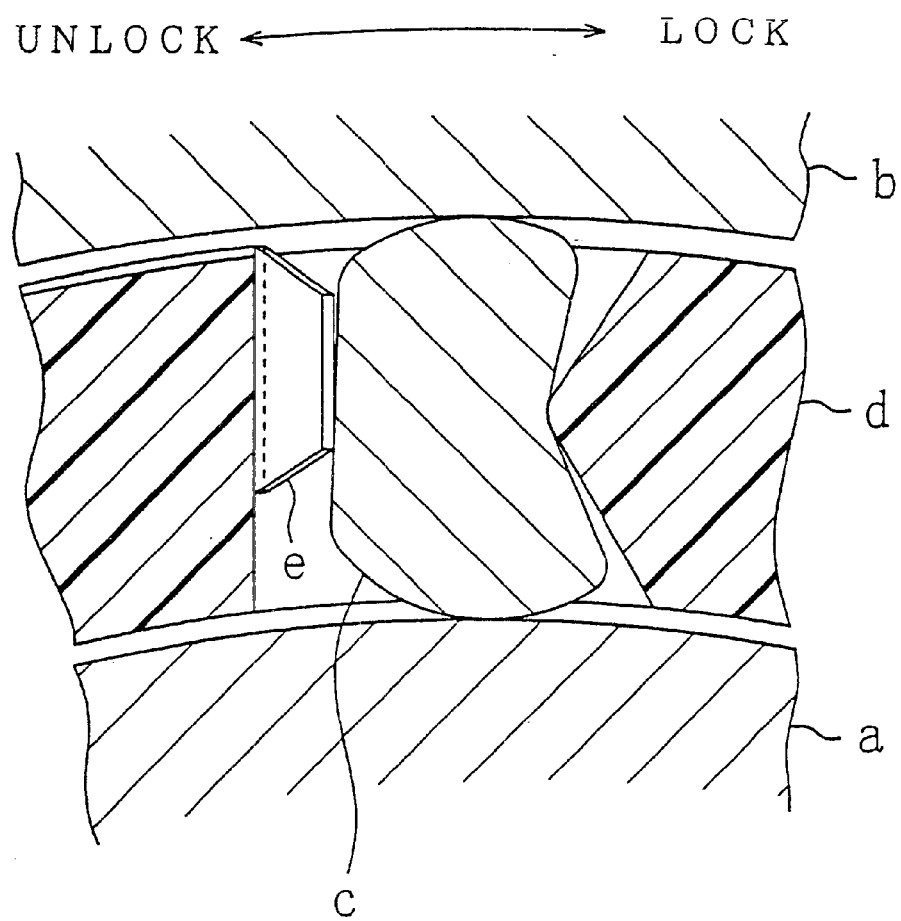
FIG. 10 is a transverse cross-sectional view showing an essential part of a one-way clutch using a flat spring.
Figure 11:
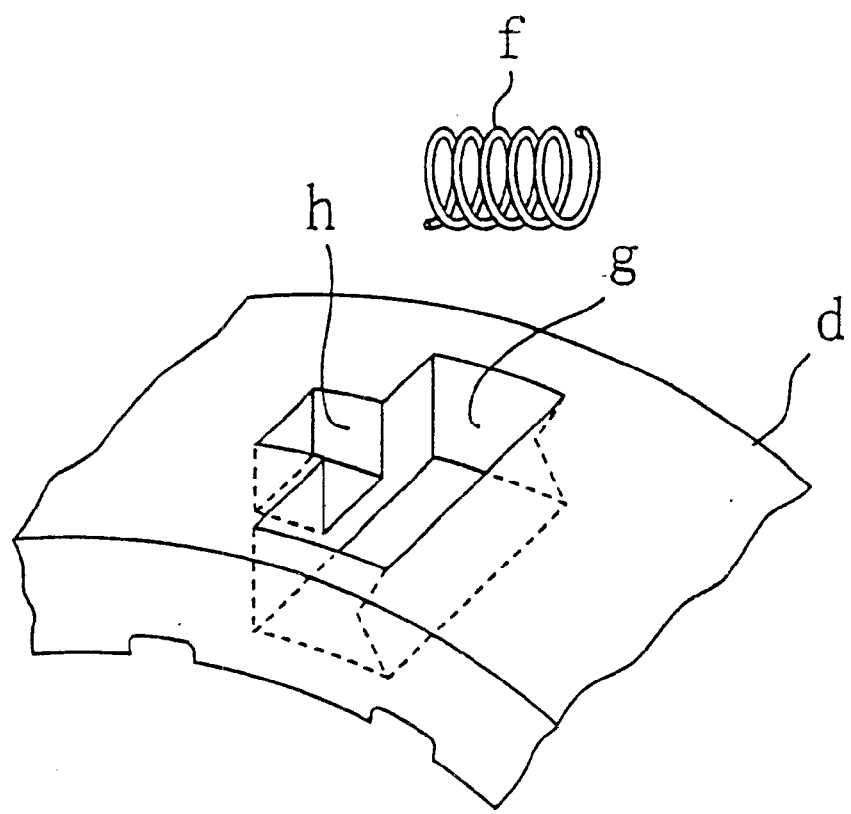
FIG. 11 is a corresponding view of FIG. 1, which shows a conventional one-way clutch using a coil spring.
Figure 12:
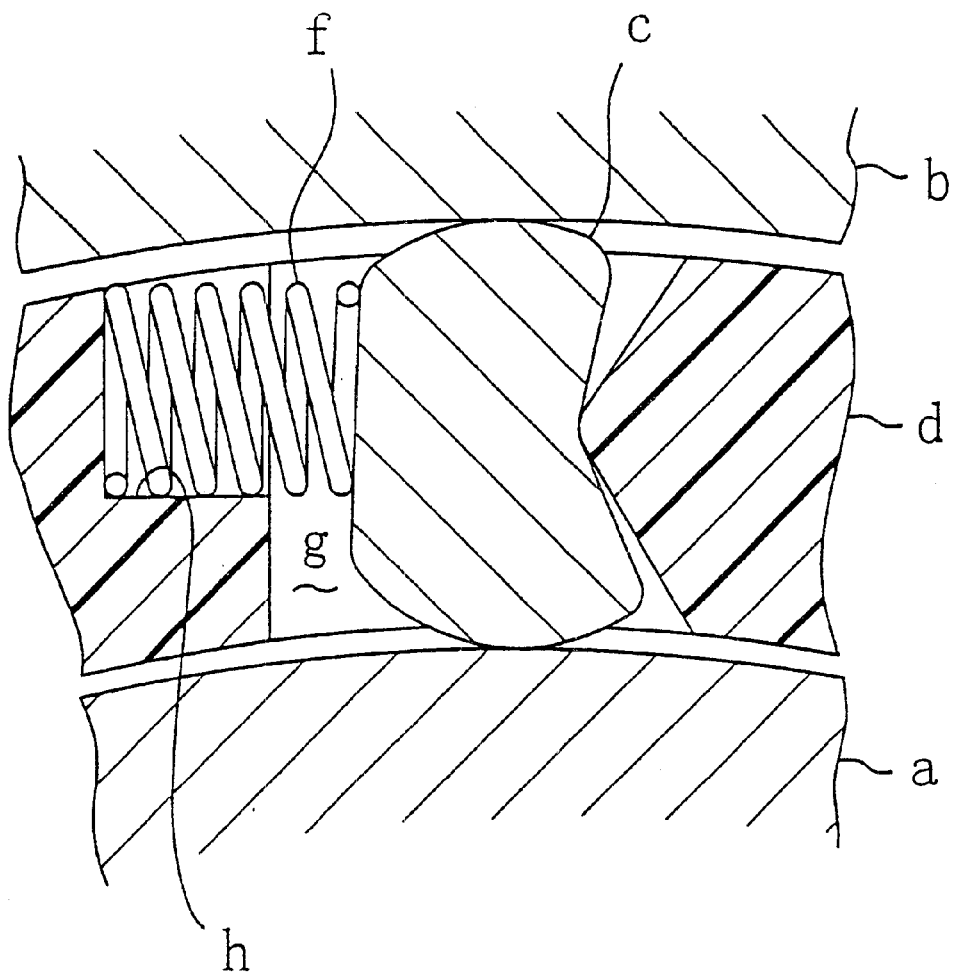
FIG. 12 is a corresponding view of FIG. 4, which shows an essential part of the conventional one-way clutch.
Figure 13:
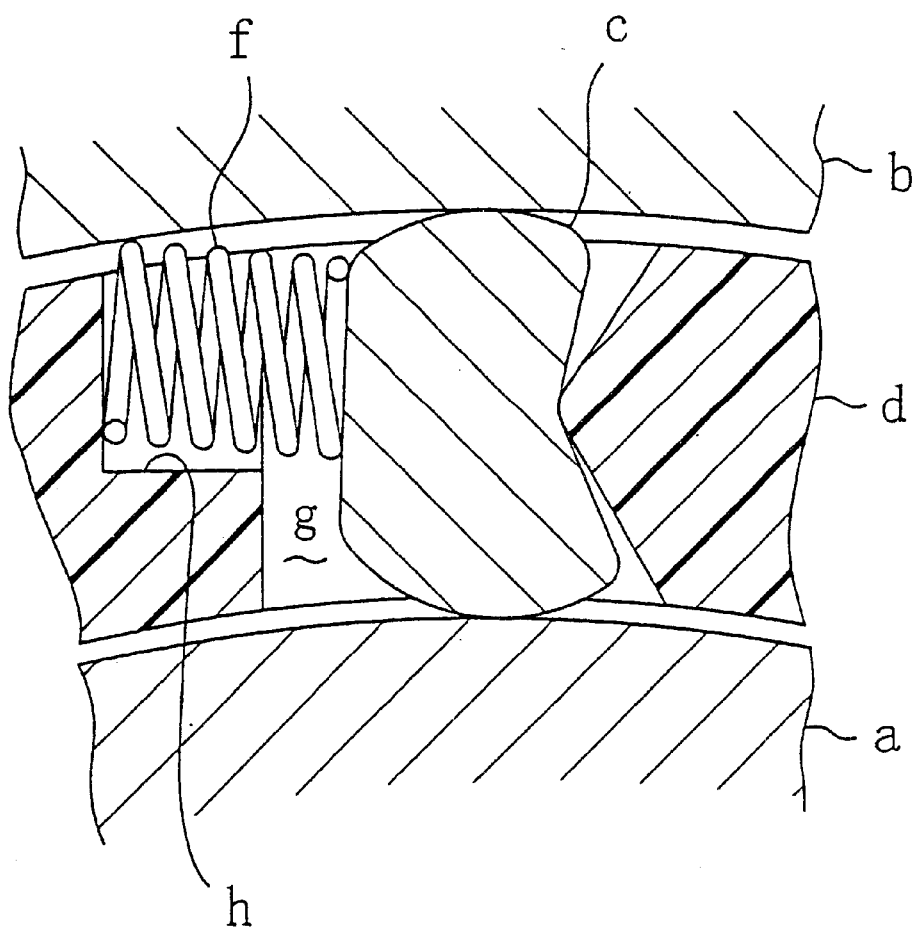
FIG. 13 is a corresponding view of FIG. 12, which shows with exaggeration the conventional one-way clutch with the root end of the coil spring changed in position toward the outer ring.
Figure 14:
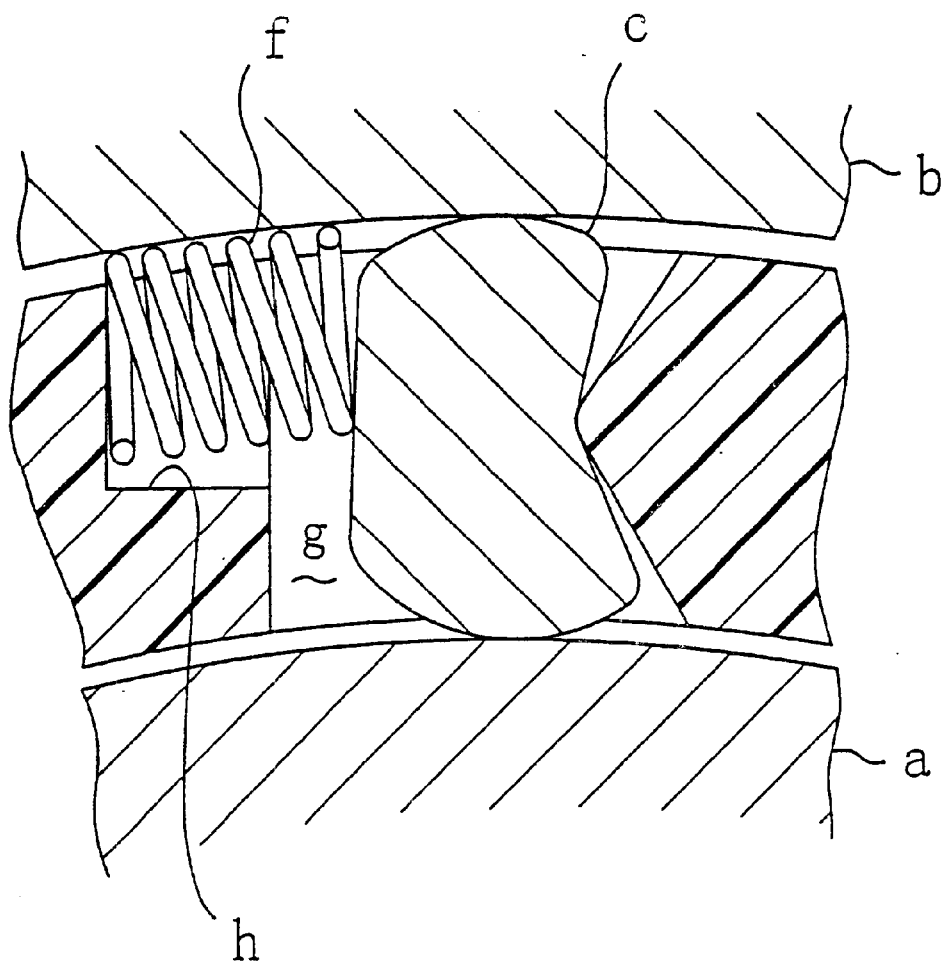
FIG. 14 is a corresponding view of FIG. 12, which shows with exaggeration the conventional one-way clutch with the distal end of the coil spring changed in position toward the outer ring.

For comparison, using as a comparative example a conventional one-way clutch-integrated pulley in which a spring member for each intermediate member is formed of a single coil spring, the same experiment was also carried out under the same conditions as in the above case. The calculated mean value of delay angles in the comparative example was in the order of slightly above 4°. The mean values of delay angles in these inventive and comparative examples are shown together in FIG. 9.

As can be seen from the above, the inventive example is about 1° smaller in delay angle than the comparative example.

INDUSTRIAL APPLICABILITY

As described so far, the one-way clutch according to the present invention is excellent in durability and attains excellent response to high-frequency vibrations and therefore is also suitable for use as a clutch operated at high speeds with, for example, an automotive engine.

What is claimed is:

1. A one-way clutch comprising:

an inner ring;

an outer ring disposed coaxially around an outer periphery of the inner ring and assembled relatively rotatably with the inner ring;

a cage disposed between the inner and outer rings for relative rotation with respect to the inner and outer rings;

a plurality of intermediate members that are each retained in the cage so as to be changeable in position in a plane orthogonal to the axis of the inner and outer rings, change the position thereof to wedge between the inner and outer rings upon relative rotation of the inner and outer rings in a locking direction to effect torque transmission between the inner and outer rings, and change the position thereof opposite to the direction of wedging between the inner and outer rings upon relative rotation of the inner and outer rings in an idling direction to block torque transmission between the inner and outer rings; and a plurality of spring members, disposed correspondingly to the intermediate members in the cage, for pressing the corresponding intermediate members to wedge the intermediate members between the inner and outer rings, wherein each of the spring members includes: a plurality of coil springs that are juxtaposed to align in an axial direction of the inner and outer rings and extend in a direction to press the corresponding intermediate member, are retained at one ends thereof by the cage and resiliently contact at the other ends thereof with the intermediate member; and a connecting portion for connecting the one ends of the plurality of coil springs together.

2. The one-way clutch of claim 1, wherein the number of coil springs provided in each of the spring members is two, and the two coil springs and the connecting portion of each of the spring members are formed of a single wire.

3. The one-way clutch of claim 1 or 2, wherein the end of a wire forming the other end of the coil spring is formed to avoid contact with the inner and outer rings.

4. The one-way clutch of claim 1 or 2, wherein the one-way clutch is disposed in a torque transmission path for transmitting torque of a crank shaft revolving with angular velocity variations due to an explosion stroke of a vehicle engine to an input shaft of auxiliary equipment through a power transmission belt.

5. The one-way clutch of claim 4, wherein the inner ring is provided to be connectable with one of the crank shaft of the vehicle engine and the input shaft of the auxiliary equipment, and the outer ring is provided with a pulley section for training the power transmission belt therearound to rotate unitarily with the outer ring.

* * * * *

UNITED STATES PATENT AND TRADEMARK OFFICE
CERTIFICATE OF CORRECTION

PATENT NO. : 6,446,775 B2  
DATED : September 10, 2002  
INVENTOR(S) : Shuichi Nagaya et al.

It is certified that error appears in the above-identified patent and that said Letters Patent is hereby corrected as shown below:

Title page,
Item [73], Assignee, please add the second assignee as follows:
-- NTN Corporation,
  Osaka (JP) --

Signed and Sealed this

Twenty-eighth Day of October, 2003

JAMES E. ROGAN
*Director of the United States Patent and Trademark Office*